United States Patent
Al-Sharif et al.

(10) Patent No.: US 12,498,073 B2
(45) Date of Patent: Dec. 16, 2025

(54) IN-PIPE LOCALIZATION OF PIPELINE INSPECTION GADGETS

(71) Applicant: Saudi Arabian Oil Company, Dhahran (SA)

(72) Inventors: Mohammed H. Al-Sharif, Thuwal (SA); Ahmed Aljarro, Thuwal (SA); Khalid S. Ghamdi, Dhahran (SA); Salah A. Zahrani, Dhahran (SA); Mohammed T. Abdulmohsin, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 329 days.

(21) Appl. No.: 18/185,068

(22) Filed: Mar. 16, 2023

(65) Prior Publication Data
US 2024/0309983 A1    Sep. 19, 2024

(51) Int. Cl.
*F16L 55/48* (2006.01)
*F16L 101/30* (2006.01)
*G01C 21/16* (2006.01)

(52) U.S. Cl.
CPC ............ *F16L 55/48* (2013.01); *G01C 21/16* (2013.01); *F16L 2101/30* (2013.01)

(58) Field of Classification Search
None
See application file for complete search history.

(56) References Cited

U.S. PATENT DOCUMENTS

| | | | | |
|---|---|---|---|---|
| 4,747,317 A | * | 5/1988 | Lara | E21B 47/022 73/866.5 |
| 5,115,196 A | * | 5/1992 | Low | G01N 27/82 324/262 |

(Continued)

FOREIGN PATENT DOCUMENTS

| | | |
|---|---|---|
| CN | 114352845 A | 4/2022 |
| EP | 0272073 A2 | 6/1988 |

(Continued)

OTHER PUBLICATIONS

Aghdam et al., "Localizing Pipe Inspection Robot Using Visual Odometry," 2014 IEEE International Conference on Control System, Computing and Engineering (ICCSCE 2014), Nov. 28-30, 2014, 6 pages.

(Continued)

*Primary Examiner* — Mark A Shabman
(74) *Attorney, Agent, or Firm* — Fish & Richardson P.C.

(57) ABSTRACT

Systems and methods for localizing a traveling device in a pipeline include a traveling device comprising a plurality of electromagnetic sensors and an inertial measurement unit; acquiring a plurality of measurements from the inertial measurement unit; estimating a velocity and an orientation of the traveling device based on the plurality of measurements from the inertial measurement unit; acquiring a plurality of measurements from the plurality of electromagnetic sensors; detecting a plurality of landmarks of the pipeline based on the plurality of measurements from the plurality of electromagnetic sensors; calculating an average velocity of the traveling device based on the detected plurality of landmarks; and determining a location and an orientation of the traveling device based on the estimated velocity, the estimated orientation, and the calculated average velocity.

20 Claims, 5 Drawing Sheets

(56) References Cited

U.S. PATENT DOCUMENTS

| | | | |
|---|---|---|---|
| 5,769,164 A | | 6/1998 | Archer |
| 6,023,986 A | * | 2/2000 | Smith .................. G01M 3/005 |
| | | | 73/866.5 |
| 6,553,322 B1 | * | 4/2003 | Ignagni .................. F16L 55/48 |
| | | | 701/472 |
| 6,768,959 B2 | | 7/2004 | Ignagni |
| 7,841,249 B2 | | 11/2010 | Tormoen |
| 8,689,653 B2 | | 4/2014 | Cogen et al. |
| 8,973,444 B2 | | 3/2015 | Hill et al. |
| 10,132,823 B2 | | 11/2018 | Giunta et al. |
| 10,851,947 B2 | | 12/2020 | Gong et al. |
| 10,931,871 B2 | | 2/2021 | Li et al. |
| 11,519,546 B2 | | 12/2022 | Louise-Alexandrine Baron et al. |
| 2004/0173116 A1 | | 9/2004 | Ghorbel et al. |
| 2007/0062274 A1 | | 3/2007 | Chikenji et al. |
| 2008/0250869 A1 | | 10/2008 | Breed et al. |
| 2009/0090518 A1 | | 4/2009 | Coon et al. |
| 2009/0128141 A1 | | 5/2009 | Hopmann et al. |
| 2011/0114119 A1 | * | 5/2011 | Yang .................. F16L 55/48 |
| | | | 134/8 |
| 2011/0199228 A1 | | 8/2011 | Roddy et al. |
| 2014/0345878 A1 | | 11/2014 | Murphree et al. |
| 2016/0362937 A1 | | 12/2016 | Dyer et al. |
| 2017/0138524 A1 | * | 5/2017 | El-Sheimy ........... G01C 21/165 |
| 2017/0226849 A1 | | 8/2017 | Fan et al. |
| 2018/0094519 A1 | | 4/2018 | Stephens et al. |
| 2019/0339230 A1 | | 11/2019 | Khalaj Amineh et al. |
| 2019/0346333 A1 | | 11/2019 | Youcef-Toumi et al. |
| 2020/0400419 A1 | | 12/2020 | Li et al. |
| 2021/0174486 A1 | | 6/2021 | Chowhan |
| 2022/0136637 A1 | | 5/2022 | Kwan |
| 2022/0178244 A1 | | 6/2022 | Fouda et al. |
| 2022/0268392 A1 | | 8/2022 | Moreau et al. |
| 2023/0054659 A1 | | 2/2023 | Danilov et al. |
| 2023/0175916 A1 | | 6/2023 | Fouda et al. |
| 2023/0176015 A1 | | 6/2023 | Fadhel et al. |
| 2023/0204146 A1 | * | 6/2023 | Laursen .................. F16L 55/40 |
| | | | 73/865.8 |

FOREIGN PATENT DOCUMENTS

| | | |
|---|---|---|
| GB | 2226633 | 7/1990 |
| KR | 20220105076 | 7/2022 |
| RU | 2697008 | 8/2019 |
| RU | 2722636 | 6/2020 |
| WO | WO 1999032902 A2 | 7/1999 |
| WO | WO 2017153896 | 9/2017 |

OTHER PUBLICATIONS

Al-Masri et al., "Inertial Navigation System of Pipeline Inspection Gauge," IEEE Transactions on Control Systems Technology, Nov. 18, 2018, 28(2):609-616, 8 pages.

Buzi et al., "Sensor Ball: An Autonomous Untethered Logging Platform," Presented at the Offshore Technology Conference, Houston, Texas, May 4, 2020, 10 pages.

Ékes et al., "Pipe Penetrating Radar Inspection of Large Diameter Underground Pipes," Proceedings of the 15th International Conference on Ground Penetrating Radar, 2014, 4 pages.

Gomez et al., "An Ultrasonic Profiling Method for Sewer Inspection," IEEE International Conference on Robotics and Automation, Apr. 2004, 5:4858-4863, 6 pages.

International Search Report and Written Opinion in International Appln. No. PCT/US2024/018613, mailed on May 3, 2024, 13 pages.

Kazeminasab et al., "Localization, Mapping, Navigation, and Inspection Methods in In-Pipe Robots: A Review," IEEE Access, Nov. 23, 2021, 9:162035-58, 24 pages.

Liu et al., "The Use of Laser Range Finder on a Robotic Platform for Pipe Inspection," Mechanical Systems and Signal Processing, Aug. 2012, 31:246-257, 12 pages.

Murtra et al., "IMU and Cable Encoder Data Fusion for In-Pipe Mobile Robot Localization," Presented at the IEEE Conference on Technologies for Practical Robot Applications (TePRA), Woburn, Massachusetts, Apr. 22-23, 2013, 6 pages.

Nassiraei et al., "A New Approach to the Sewer Pipe Inspection: Fully Autonomous Mobile Robot "Kantaro"," IECON 2006—32nd Annual Conference on IEEE Industrial Electronics, Nov. 6-10, 2006, 4088-4093, 6 pages.

Ooi et al., "EM-Based 2D Corrosion Azimuthal Imaging using Physics Informed Machine Learning PIML," Prepared for presentation at the SPE Offshore Europe Conference & Exhibition, Sep. 7-10, 2021, 15 pages.

Santana et al., "Estimation of Trajectories of Pipeline PIGs Using Inertial Measurements and Non Linear Sensor Fusion," Presented at the 9th Annual IEEE/IAS International Conference on Industry Applications (INDUSCON), Sao Paulo, Brazil, Nov. 8-10, 2010, 6 pages.

Strapdown Inertial Navigation Technology, 2nd Edition, 2004, Chapter 3, 41 pages.

ucarecdn.com [online], "Specifications and requirements for in-line inspection of pipelines," Nov. 3, 2016, retrieved on Mar. 6, 2024, URL <https://ucarecdn.com/58371ddd-72ea-4cf4-9422-4c9fbfd5cac1/01 2016_Version.pdf>, 57 pages.

U.S. Appl. No. 18/449,295, Aljarro et al., Smart Body For Contactless Detection of Defects Using Artificial Intelligence, filed Aug. 14, 2023, 45 pages.

U.S. Appl. No. 18/502,869, Al-Sharif et al., In-Pipe Localization of Tools Using Signal Profiles, filed Nov. 6, 2023, 36 pages.

U.S. Appl. No. 18/502,904, Al-Sharif et al., In-pipe Localization of Tools Using Time Between Signals, filed Nov. 6, 2023, 44 pages.

U.S. Appl. No. 18/449,327, Aljarro et al., Traceable and Disintegrable Artificial Intelligence Powered Sensing System and Method for The Detection of Defects in Pipelines, filed Aug. 14, 2023, 48 pages.

Wang et al., "Navigation of a Mobile Robot in a Dynamic Environment Using a Point Cloud Map," Artificial Life and Robotics, Jul. 26, 2020, 26:10-20, 11 pages.

Wu et al., "A Practical Minimalism Approach to In-pipe Robot Localization," 2019 American Control Conference (ACC), Jul. 10-12, 2019, 8 pages.

Wu, "Low-Cost Soft Sensors and Robots for Leak Detection in Operating Water Pipes," Thesis for the degree of Doctor of Philosophy in Mechanical Engineering, Massachusetts Institute of Technology, Department of Mechanical Engineering, Jun. 2018, 247 pages.

International Search Report and Written Opinion in International Appln. No. PCT/US2024/042100, mailed on Nov. 25, 2024, 18 pages.

International Search Report and Written Opinion in International Appln. No. PCT/US2024/042123, mailed on Nov. 28, 2024, 16 pages.

International Search Report and Written Opinion in International Appln. No. PCT/US2024/054692, mailed on Feb. 10, 2025, 14 pages.

International Search Report and Written Opinion in International Appln. No. PCT/US2024/054686, mailed on Feb. 25, 2025, 13 pages.

\* cited by examiner

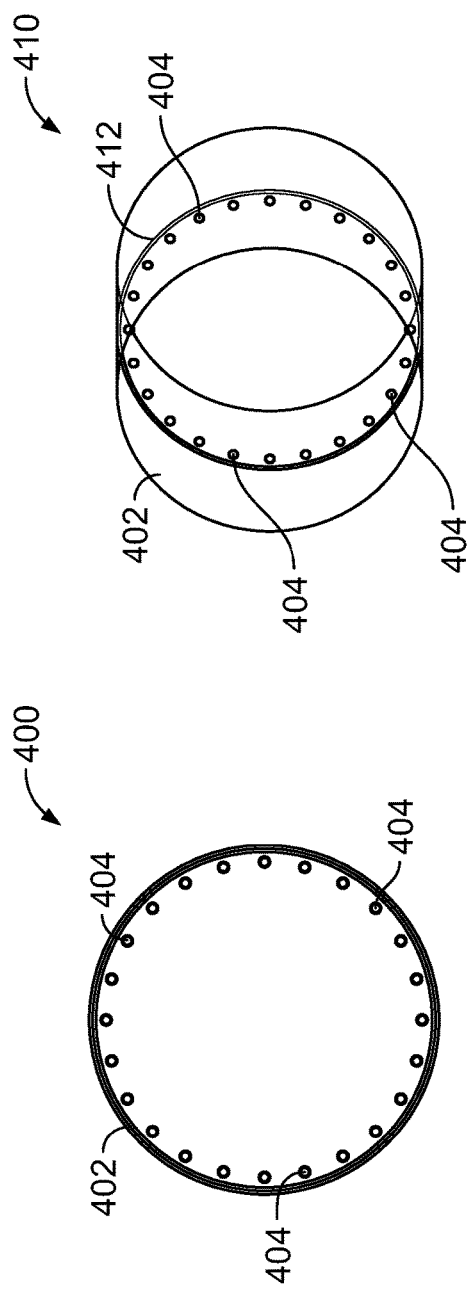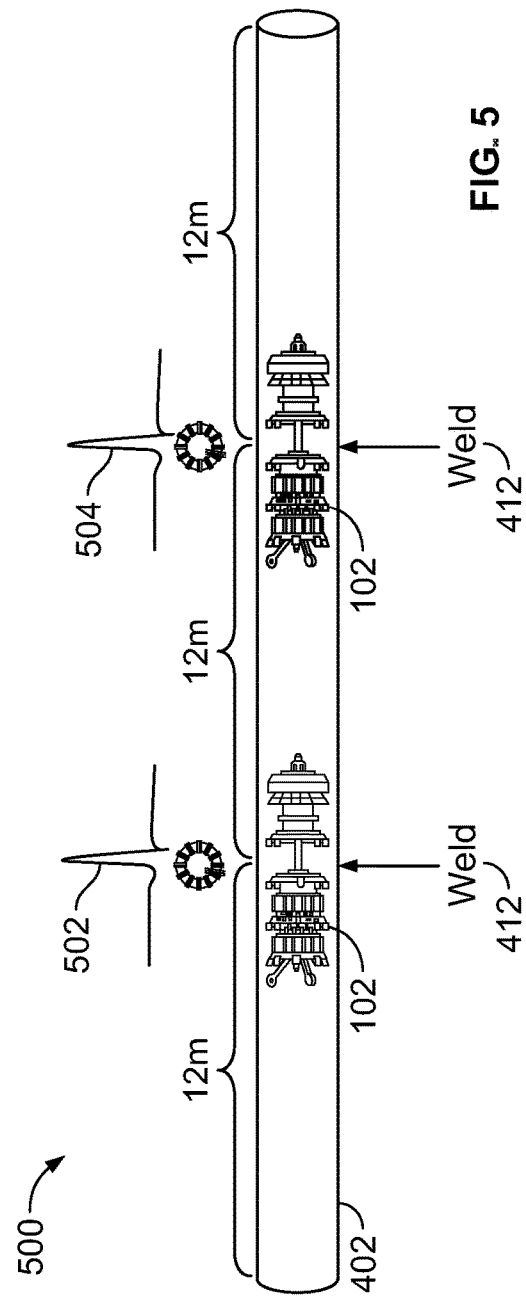

IN-PIPE LOCALIZATION OF PIPELINE INSPECTION GADGETS

TECHNICAL FIELD

The present disclosure generally relates to in-pipe localization of pipeline inspection gadgets.

BACKGROUND

Pipelines are important assets for transporting liquids or gases. Pipelines are exposed to harsh internal or external conditions that cause degradation in the quality of the pipelines leading to corrosion, wall loss, or even leakage. Therefore, pipelines are periodically inspected to assess the health of the pipeline and to detect possible signs of damages before they become more severe. The inspection of pipelines is usually carried out by a robot or a gadget that travels inside the pipelines with the objective of detecting signs of defects while traveling through the pipeline. These inspection practices are used in the oil and gas industry to assess the integrity of assets. An accurate localization of a traveling robot or gadget within the pipeline allows correct positioning of any identified defects.

SUMMARY

This specification describes systems and methods for monitoring, tracking, and determining the location of devices, such as, a pipeline inspection gadget (PIG) when traveling through a pipeline. The system uses electromagnetic sensors mounted on the traveling device (e.g., PIG) to detect landmarks (e.g., welds) in a pipeline. The sensor data is processed via artificial intelligence for increased accuracy in distinguishing the responses that correspond to in-pipe landmarks from the other responses. The localization is achieved by recording the timestamp when a landmark is detected and using a known distance between landmarks to calculate an average velocity. The system also uses an onboard inertial measurement unit to estimate a velocity and traveled distance along the pipeline. A data processing system correlates the calculated average velocity from the landmark detection with the estimated average velocity from the inertial measurement unit to estimate the location of the traveling device and reduce error buildup in the estimated velocity and position based on the inertial measurement unit measurements.

The methods and systems enable one or more of the following technical advantages. This system and method are independent of the requirement for installing external sensors and associated supporting infrastructure outside of the pipeline, reducing the cost to maintain and operate this system. This system and method have a contactless interaction with the pipe by using electromagnetic sensors. The landmark detection provides an independent reference of the velocity of the traveling device, improving localization accuracy by reducing error buildup that occurs when using an inertial measurement unit alone.

One or more of these advantages are enabled by one or more of the following embodiments.

In one aspect, a system for localizing a traveling device in a pipeline includes a traveling device comprising a plurality of electromagnetic sensors and an inertial measurement unit; at least one processor; and a memory storing instructions that when executed by the at least one processor cause the at least one processor to perform operations including acquiring a plurality of measurements from the inertial measurement unit; estimating a velocity and an orientation of the traveling device based on the plurality of measurements from the inertial measurement unit; acquiring a plurality of measurements from the plurality of electromagnetic sensors; detecting a plurality of landmarks of the pipeline based on the plurality of measurements from the plurality of electromagnetic sensors; calculating an average velocity of the traveling device based on the detected plurality of landmarks; and determining a location and an orientation of the traveling device based on the estimated velocity, the estimated orientation, and the calculated average velocity.

In one aspect, a method for localizing a traveling device in a pipeline, the traveling device including an inertial measurement unit and a plurality of electromagnetic sensors, the method includes acquiring a plurality of measurements from the inertial measurement unit; estimating a velocity and an orientation of the traveling device based on the plurality of measurements from the inertial measurement unit; acquiring a plurality of measurements from the plurality of electromagnetic sensors; detecting a plurality of landmarks of the pipeline based on the plurality of measurements from the plurality of electromagnetic sensors; calculating an average velocity of the traveling device based on the detected plurality of landmarks; and determining a location and an orientation of the traveling device based on the estimated velocity, the estimated orientation, and the calculated average velocity.

In one aspect, one or more non-transitory machine-readable storage devices storing instructions for localizing a traveling device in a pipeline, the traveling device comprising an inertial measurement unit and a plurality of electromagnetic sensors, the instructions being executable by one or more processing devices to cause performance of operations including accessing, from a data store, a plurality of measurements from the inertial measurement unit and a plurality of measurements from the plurality of electromagnetic sensors; estimating a velocity and an orientation of the traveling device based on the plurality of measurements from the inertial measurement unit; detecting a plurality of landmarks of the pipeline based on the plurality of measurements from the plurality of electromagnetic sensors; calculating an average velocity of the traveling device based on the detected plurality of landmarks; and determining a location and an orientation of the traveling device based on the estimated velocity, the estimated orientation, and the calculated average velocity.

Embodiments of these aspects may include one or more of the following features.

In some embodiments, the traveling device is a pipeline inspection gadget.

In some embodiments, the operations include determining a location of a defect in the pipeline based on the determined location and orientation of the traveling device.

In some embodiments, the plurality of electromagnetic sensors is regularly distributed in a ring shape, the ring shape having a diameter smaller than an inner diameter of the pipeline.

In some embodiments, the inertial measurement unit includes an accelerometer and a gyroscope. In some cases, the plurality of measurements from the inertial measurement unit includes linear acceleration and angular velocity.

In some embodiments, the plurality of landmarks includes a plurality of weld joints joining adjacent pipe segments.

In some embodiments, the determining a location and an orientation of the traveling device includes using an extended Kalman filter and a Rauch-Tung-Striebel smoother.

In some embodiments, detecting a plurality of landmarks includes a neural network having inputs and outputs, the inputs of the neural network comprise time-series of induced signature from the plurality of electromagnetic sensors, the outputs of the neural network comprise time stamps of detected landmarks.

In some embodiments, estimating a velocity and an orientation of the traveling device comprises using an extended Kalman filter to combine the plurality of measurements from the inertial measurement unit with an estimated acceleration of the traveling device based on the motion dynamics of the traveling device.

In some embodiments, estimating a velocity and an orientation of the traveling device includes using an extended Kalman filter to combine the plurality of measurements from the inertial measurement unit with an estimated acceleration of the traveling device based on the motion dynamics of the traveling device.

The details of one or more embodiments of these systems and methods are set forth in the accompanying drawings and the description to be presented. Other features, objects, and advantages of these systems and methods will be apparent from the description and drawings, and from the claims.

DESCRIPTION OF DRAWINGS

FIG. 4A-4B are views of a distribution of electromagnetic sensors with respect to a pipeline.

FIG. 5 is an illustration depicting a series of landmark detections within a pipeline.

Like reference symbols in the various drawings indicate like elements.

DETAILED DESCRIPTION

This specification describes systems and methods for monitoring, tracking, and determining the location of devices such as a pipeline inspection gadget (PIG) traveling through a pipeline. The traveling device includes electromagnetic sensors to detect landmarks that are regularly positioned within the pipeline, for example, welds. These welds are present as a result of joining pairs of pipe segments, also known as spools, which are of a standard length that is readily known. The traveling device and an associated data processing system record a timestamp whenever a weld is detected. The average velocity and traveled distance of the moving device is determined from two consecutive landmark detections. Additionally, the traveling device includes an onboard inertial measurement unit, which in some embodiments includes an accelerometer and a gyroscope to measure acceleration and angular velocity of the traveling device. The data processing system combines the estimated average velocity and traveled distance obtained from the detection of landmarks with the readings obtained from the inertial measurement unit to determine the location of the traveling device inside the pipeline using an extended Kalman filter and Rauch-Tung-Striebel smoother.

The systems and methods of this specification enable the localization of PIGs, or robots, traveling through pipelines in global positioning system (GPS) denied environments, for example, pipelines deeply buried underground. These systems provide a self-reliant in-pipe localization via detection of welds that connect pipeline segments or other regularly occurring landmarks in the pipeline; combined with an inertial navigation system (INS) based on inertial measurement unit measurements for accurate localization and without the need to confer with any external-to-the-pipeline devices or landmarks. These systems and methods provide higher accuracy, and lower computational complexity and hardware cost when compared to other existing systems that require both in-pipe and out-of-pipe interaction dependency for an accurate localization. These systems and methods are attachable to and/or integrate-able with standard PIGs, robots, or other inspection tools.

Figure 1A:
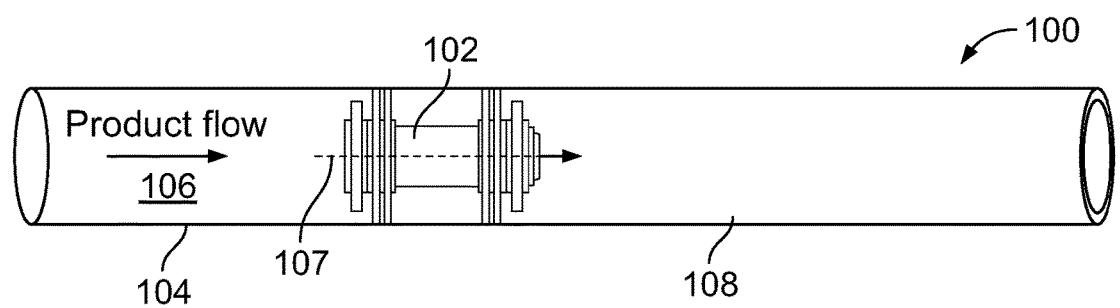
FIG. 1A is an illustration of a pipeline inspection gadget within pipeline.

FIG. 1A shows a diagram 100 of a PIG 102 within a pipeline 104. The product flow 106 in the pipeline moves the PIG 102 along a longitudinal axis 107 of the pipeline. Example products that flow in the pipeline include crude oil, petroleum products, and water. As the PIG 102 moves through the pipeline, the PIG detects deposits 108 that have built up overtime within the pipeline 104. The PIG 102 can also detect other surface defects of the pipeline 104 that can indicate corrosion or wall loss.

Figure 1B:
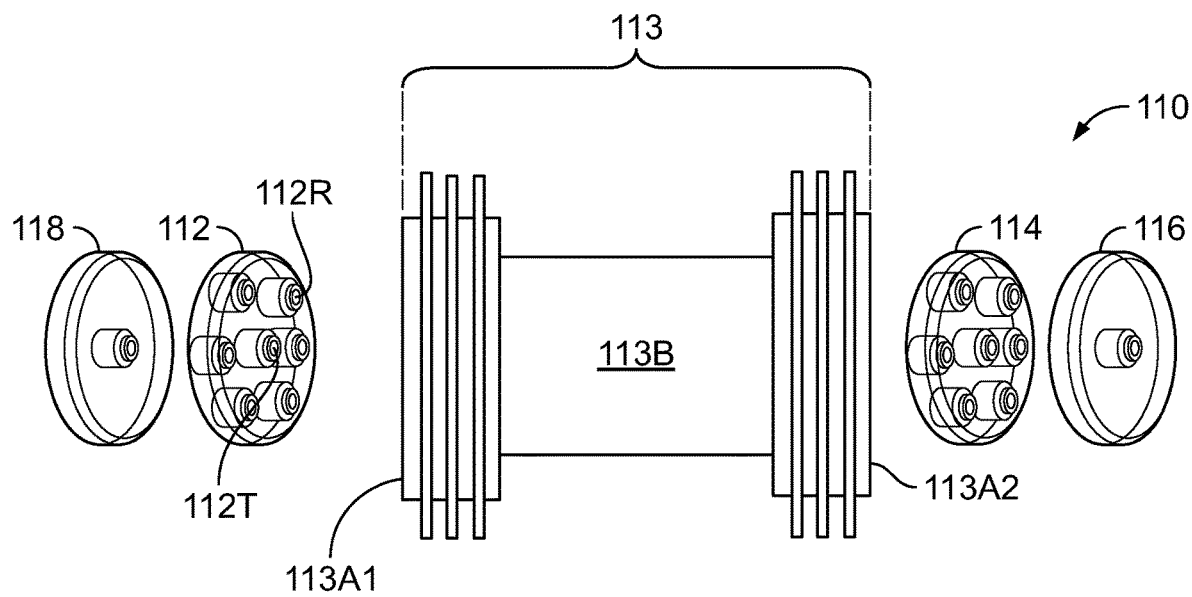
FIG. 1B is a schematic of a pipeline inspection device.

FIG. 1B shows a diagram 110 illustrating an example PIG 113. The PIG 113 includes systems to detect defects in walls of the pipe and to identify the location of the FIG. The PIG 113 includes capsules 112, 114, 116, and 118 positioned at the front and/or back of its body. The PIG 113 includes an inertial measurement unit inside the body 113B. The inertial measurement unit includes sensors such as accelerometers and gyroscopes to measure the acceleration and angular velocity of the PIG 113. As illustrated, capsules 112 and 114 incorporate a combination of electromagnetic (EM) transmitters (e.g., 112T) and receivers (e.g., 112R) while capsules 116 and 118 incorporate a transmitter only. These capsules equipped with EM transmitters and/or receivers are designed to be attached to the body of the PIG 113 as the PIG is carried through the pipeline 104. The capsules can be retrofitted to a standard PIG. The transmitters and receivers for detecting all defects are located at the front and/or the back end of the PIG and are configured with the sensors distributed to cover a 360 degree field of view. These sensors can also be used to detect welds in the pipe as input to the location determination approach described with reference to FIG. 2.

In one illustration, the transmitter, responsible for emitting the initial electromagnetic signal for inspection of the target pipeline, is configured to operate at a frequency selected to interact with the material composition of the target pipeline to inspect the integrity of the pipe wall. In some cases, the material composition includes carbon steel, for example API 5L X60. The receivers, responsible for collecting the transmitted signal after its interaction with the wall of the target pipeline, are configured to couple to this transmitted signal interacting with the wall in a manner that decouples and distinguishes defective segments of the pipe and/or welds in the pipe.

In some implementations, capsules 112, 114, and 116 are mounted at the front end or the back end of a PIG. For example, capsules 112, 114, 116, and 118 are coaxially mounted with respect to the PIG. As illustrated, the transmitter (e.g., 112T) is mounted towards the center of the capsule, which emits EM signals in the form of, for example, pulsed waveforms, or almost continuous wave (CW). The transmitter can be configured as a coiled antenna, a dipole antenna, or a combination thereof. The radiation pattern of the transmitter can be omni-directional in the circumferential aspect so that the cross-section of the pipe that is co-planar with the capsule receives relatively uniform EM radiation.

The receivers (e.g., 112R) are positioned on the circumference of the capsule to be in close proximity to, but without contacting, the inner surface of the pipe. In some cases, the receivers are evenly distributed around the circumference of the capsule. The receivers may be stationary relative to the PIG and spaced at equal distances from the transmitter. The receivers may be tuned to encompass a larger bandwidth than the transmitter. The receivers are configured to receive EM signals in response to radiated EM signals from the transmitter in the surrounding of the inner wall of the pipe for detection of welds within the pipe. In some implementations, the sensors serve a dual purpose, detection of welds and assessment of the integrity of the wall, where losses in the inner and outer surfaces as well as full wall-losses, can significantly affect the reception. Some implementations assess situations varying from inner and outer surface losses (e.g., erosion) to full wall-losses (e.g., total loss).

Data collected and recorded by the traveling device (e.g., PIG) can be processed by a data processing system onboard the traveling device. Alternatively, the data can be stored in a memory on the traveling device and accessed by a data processing system after the traveling device has been recovered from the pipeline. In some implementations, the data may be transmitted to another device while the traveling device is traveling through the pipeline. For example, the data may be transmitted to a second device that is tracking the traveling device (e.g., an accompanying vehicle such as a crawler, robot, or drone). The data processing system may reside on the second device.

Localization of an in-pipe PIG (e.g., 102) is a challenging task, particularly in buried pipelines. In buried pipelines, there is no GPS signal connectivity, such pipelines are sometimes designated as GPS denied territories. A localization system in buried pipelines cannot rely on the use of GPS navigation systems. In addition, it is not practical to dig underground to install external sensors around a pipeline. It is advantageous that localization systems of PIGs/robots traveling through pipelines rely on self-contained sensors. For example, self-contained sensors such as accelerometers can be integrated, attached to, or placed on-board a device without the need for external references to correctly operate them.

Figure 2:
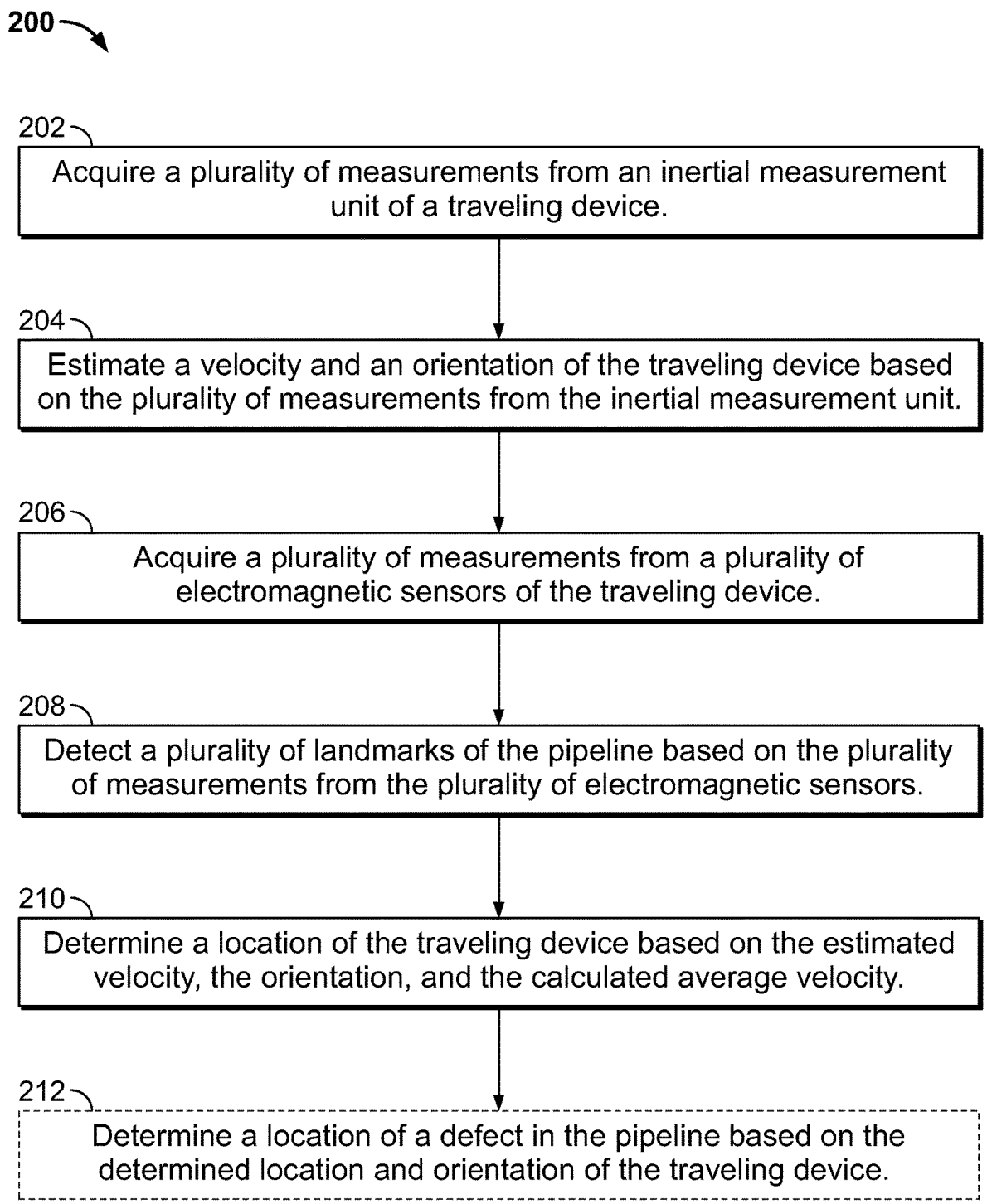
FIG. 2 is a flow chart of a method for localizing a traveling device within a pipeline.

FIG. 2 shows a flow chart of an example method 200 for localizing a traveling device in a pipeline. A processor acquires a plurality of measurements from an inertial measurement unit and stores the plurality of measurements in a data store (step 202). The inertial measurement unit is a self-contained sensor installed onboard the traveling device. In some implementations, the inertial measurement unit includes an accelerometer and a gyroscope to measure acceleration and angular velocity of the traveling device.

The data processing system estimates a velocity and an orientation of the traveling device based on the plurality of measurements from the inertial measurement unit (step 204). In some implementations, a data processing system numerically integrates a measured angular velocity $\omega_b$ to determine an orientation of the traveling device or PIG. The data processing system determines the attitude of the PIG based on the determined orientation. The data processing system also transforms an acceleration ab measured in a body frame of reference of the traveling device into a global navigation frame. The transformation is based on the determined orientation. The data processing system numerically integrates the measured acceleration, expressed in the navigation frame, to determine a velocity of the PIG. The data processing system also numerically integrates the velocity to determine a position of the PIG within the pipeline. Due to the numerical integration, positioning errors can accumulate and grow quickly with time. To reduce this source of localization errors, in some implementations, the data processing system accounts for the motion dynamics of the PIG inside the pipeline.

$$a_f = \frac{C_D \rho (V_f - V_b)^2 A}{2(m_b + m_a)},$$

Figure 3A:
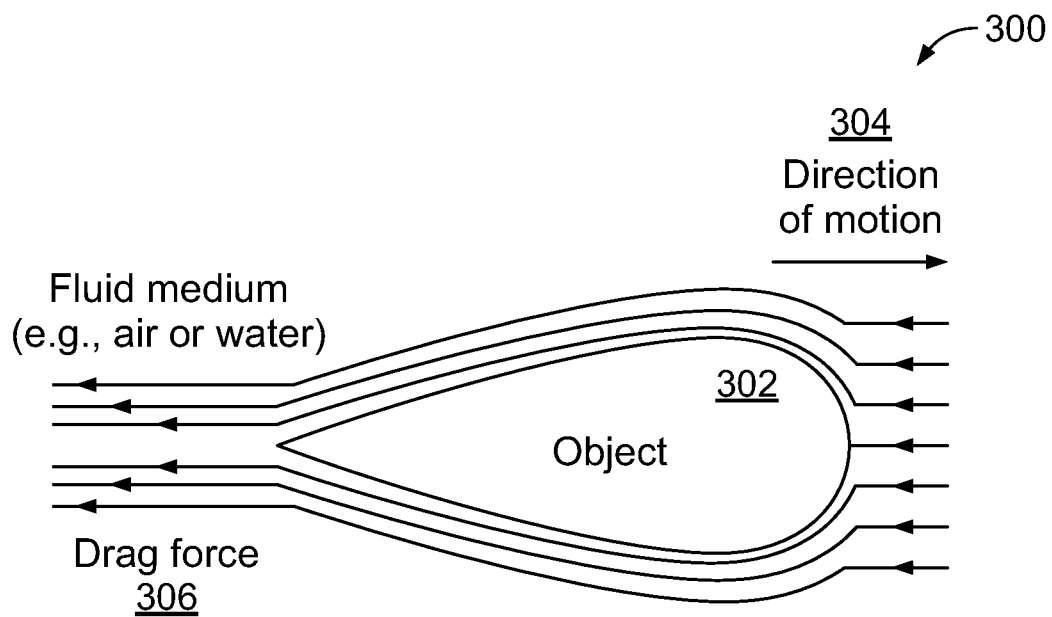
FIG. 3A is an illustration of drag force acting on a pipeline inspection gadget.

$m_a$ FIG. 3A shows an illustration 300 of example forces acting on a pipeline inspection gadget. The PIG is a passive device that is propelled by the flow of product traveling through pipes. In the illustration 300, the PIG is represented by a streamlined body 302 immersed in a fluid medium (e.g., air, water, oil). In the direction of motion 304 of the PIG, the dominant force acting on the PIG is a drag force 306. The PIG also experiences a friction force. The magnitude of the friction force is negligible in comparison with the magnitude of the drag force 306. The drag force 306 can be used to express the PIG's acceleration in terms of its velocity and the product's flow velocity. For example, $$a_f = \frac{C_D \rho (V_f - V_b)^2 A}{2(m_b + m_a)},$$

$m_a$ where $a_f$ is the acceleration of the PIG, $V_f$ is the flow velocity of the product in the pipeline, $V_b$ is the velocity of the PIG, A is a reference area, $C_D$ is a coefficient of drag based on the shape of the PIG, $m_b$ is the mass of the PIG, is the added mass, and $\rho$ is the density of the fluid in the pipeline.

$$a_f = \frac{C_D \rho (V_f - V_b)^2 A}{2(m_b + m_a)}, m_a$$

Figure 3B:
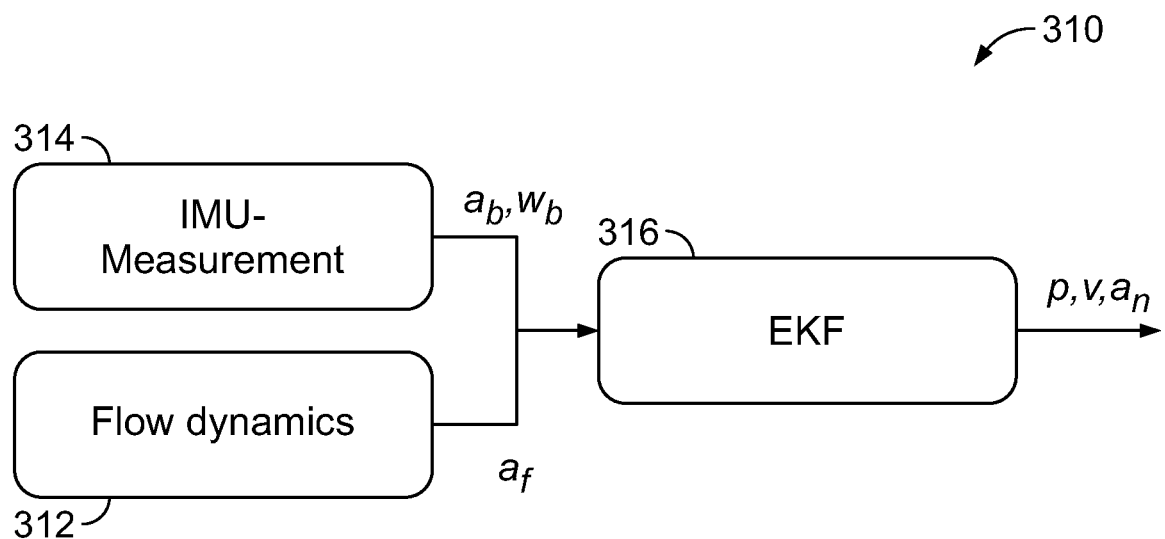
FIG. 3B is a flow chart of a method of estimating a velocity of a pipeline inspection gadget.

FIG. 3B shows a flow chart of an example method 310 of estimating the acceleration of a traveling device. In some implementations, the data processing system estimates the PIG's acceleration based on the motion dynamics of the PIG in the pipeline (step 312), and the data processing system acquires measurements of the PIG's acceleration from an accelerometer in an inertial measurement unit onboard the PIG (step 314). The data processing system combines the estimated acceleration and the measured acceleration using an extended Kalman filter (EKF) to obtain a better estimate of the acceleration of the PIG (step 316). The output of the EKF includes an estimated position p, an estimated velocity v, and an estimated acceleration $a_n$ of the traveling PIG in the global navigational frame of reference.

Referring to FIG. 2 and the method 200, the data processing system acquires a plurality of measurements from a plurality of electromagnetic sensors on the traveling device or PIG (step 206). In some implementations, the plurality of measurements includes a time-series of induced signature for electromagnetic sensors.

FIG. 4A-4B show a schematic of an example distribution of electromagnetic sensors with respect to a pipeline. FIG. 4A shows a cross-section view 400 of pipe 402 with a plurality of electromagnetic sensors 404 regularly distributed about an inside perimeter of the pipe 402 in a ring shape. The diameter of the ring shape is smaller than a diameter of the pipe 402 such that the ring of electromagnetic sensors fit within the pipe. The structure supporting the sensors is not shown in the cross-section view 400. FIG. 4B shows a second view 410 of the electromagnetic sensors 404 within the pipe 402. In the second view 410, the electromagnetic sensors are shown encountering a weld 412 around the circumference of the pipe 402.

Pipelines carrying product are composed of pipe segments that are manufactured with standard lengths and shapes. These standard pipe segments are joined using welds. The electromagnetic-based sensors onboard the traveling device interact with the pipe and a processor records the response data. Regularly spaced landmarks in the pipeline such as welds at joints between pipe segments can be detected by the electromagnetic sensors since the electric and magnetic properties of the weld are different than the electric and magnetic properties of the pipe. When the PIG passes by a weld, there is a detectable change in the measured signal across a plurality of the electromagnetic sensors. By detecting this change in the measured signal, the welds are recognized. The data processing system also records the time stamps at which a PIG passes by each weld. The electromagnetic sensors serve a dual purpose, general inspection, and diagnostics of the pipeline, and detecting weld joints in the pipelines.

The data processing system detects a plurality of landmarks of the pipeline based on the plurality of measurements acquired from the plurality of electromagnetic sensors (step 208). In some implementations, the data processing system uses an artificial intelligence (AI) model to detect landmarks in the pipeline (e.g., welds) based on the plurality of measurements acquired from the plurality of electromagnetic sensors. The artificial intelligence model can be for example a neural network or a recurrent neural network. The artificial intelligence model is trained on data of the electromagnetic sensors. The AI model can also be trained using measurements acquired from a PIG traveling through a pipeline that have been manually labeled to identify landmarks. Data extracted from the electromagnetic sensors and correctly labeled by the AI model can also be used to further update and train the AI model. The inputs to the AI model are the measured time-series signals from the plurality of electromagnetic sensors. The outputs of the AI model are timestamps of detected landmarks. The AI model increases accuracy and reliability in distinguishing responses that correspond to the in-pipe landmarks from the other responses as compared with detections by other techniques, such as a cross-correlation technique FIG. 5 is an illustration 500 of a series of example landmark detections 502 and 504 within a pipeline 402. Since pipeline 402 has segments with a known standard length, and the time stamps corresponding with the traveling device passing each weld are recorded, the data processing system estimates an average flow velocity by dividing the length of a pipe segment by the difference between two consecutive time stamps. A PIG 102 encounters a weld 412 at a first time $t_1$. The plurality of electromagnetic sensors of the PIG sense a distinguished signal response, for example a spike. The data processing system identifies the signal in the measurements as a landmark 502. At a second time $t_2$, the PIG 102 encounters another weld 412 at the next junction of two pipe segments. Again, the data processing system detects a unique signal in the measurements by the plurality of electromagnetic sensors and identifies the signal as a landmark 504. The data processing system calculates an average velocity of the PIG as it traveled from the first weld to the second weld based on the known times $t_1$ and $t_2$ and based on the known length of the standard pipe segment $L_p$. The velocity is calculated as $V_r = L_p/(t_2 - t_1)$.

The data processing system calculates an average velocity of the traveling device based on the detected plurality of landmarks of the pipeline (step 210). In some implementations, the data processing system calculates an average velocity between each pair of detected landmarks.

The data processing system determines a location and an orientation of the traveling device in the pipeline by combining the estimated velocity and estimated orientation based on the inertial measurement unit measurements with the calculated average velocity based on the landmark detections (step 210). In some implementations, the inertial measurement unit has a fixed update rate, and the weld detection algorithm has a varying update rate that depends on the velocity of the traveling device, (e.g., PIG/robot). In some implementations, the data processing system combines the estimated velocity from the inertial measurement unit and the calculated velocity from the weld detection technique using a Rauch-Tung-Striebel (RTS) smoother algorithm with an extended Kalman filter (EKF).

In some implementations, the data processing system determines a location of a defect in the pipeline based on the determined location and orientation of the traveling device (step 212).

In some implementations, these systems and methods localize a device, such as a PIG, that is traveling through a pipeline by means of detecting welds that join the pipeline segments. The method utilizes a set of advanced electromagnetic sensing techniques combined with AI to detect the welds. An inertial measurement unit is used to obtain the acceleration and the angular velocity of the moving device (e.g., PIG). The device (e.g., PIG) is equipped with a ring of electromagnetic sensors and an inertial measurement unit that includes an accelerometer and a gyroscope. An inertial navigation system (INS) estimates the position and velocity of the device, PIG, via the inertial measurement unit measurements. An extended Kalman filter (EKF) combines the INS estimates with the motion dynamics to improve the localization accuracy. An EKF is combined with a Rauch-Tung-Striebel (RTS) smoother to further improve the localization accuracy via using the weld detection mechanism.

The systems and methods of this specification have advantages over other methods of mitigating error buildup based on measurements form an inertial measurement unit. The method 200 is contactless and only depends on detecting welds via on-board electromagnetic sensors. This allows for higher accuracy as the solution does not require maintaining a contact with the wall of a pipeline reducing scratches that may be caused by for example a wheel encoder.

Figure 6:
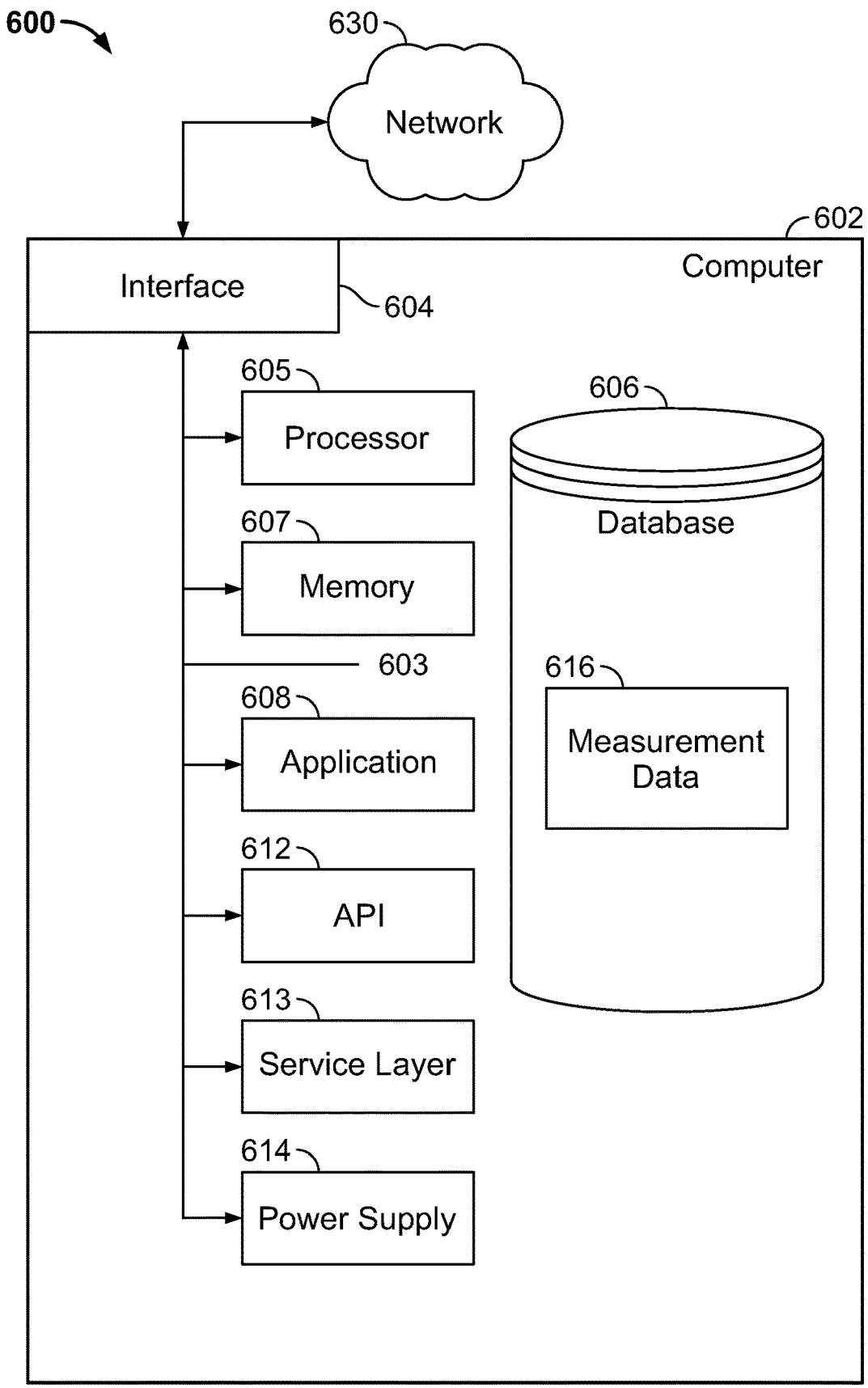
FIG. 6 is a block diagram illustrating a computer system used to provide computational functionalities associated with described algorithms, methods, functions, processes, flows, and procedures as described in the present disclosure, according to some implementations of the present disclosure.

FIG. 6 is a block diagram of an example computer system 600 used to provide computational functionalities associated with described algorithms, methods, functions, processes, flows, and procedures described in the present disclosure, according to some implementations of the present disclosure. The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a high level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both), over the system bus 603. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs.

The service layer 613 can provide software services to the computer 602 and other components (whether illustrated or not) that are communicably coupled to the computer 602. The functionality of the computer 602 can be accessible for all service consumers using this service layer. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the hardware of the interface can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 also includes a database 606 that can hold data (for example, measurement data 616) for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

The application 608 can be an algorithmic software engine providing functionality according to particular needs, desires, or particular implementations of the computer 602 and the described functionality. For example, application 608 can serve as one or more components, modules, or applications. Further, although illustrated as a single application 608, the application 608 can be implemented as multiple applications 608 on the computer 602. In addition, although illustrated as internal to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure. Moreover, the present disclosure contemplates that many users can use one computer 602 and one user can use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the scope of this disclosure. Accordingly, other embodiments are within the scope of the following claims.

What is claimed is:

1. A system for localizing a traveling device in a pipeline, the system comprising:
    a traveling device comprising a plurality of electromagnetic sensors and an inertial measurement unit;
    at least one processor; and
    a memory storing instructions that when executed by the at least one processor cause the at least one processor to perform operations comprising:
        acquiring a plurality of measurements from the inertial measurement unit;
        estimating a velocity and an orientation of the traveling device based on the plurality of measurements from the inertial measurement unit and an estimated acceleration of the traveling device based on a drag force acting on the traveling device;
        acquiring a plurality of measurements from the plurality of electromagnetic sensors;
        detecting a plurality of landmarks of the pipeline based on the plurality of measurements from the plurality of electromagnetic sensors;
        calculating an average velocity of the traveling device based on the detected plurality of landmarks; and
        determining a location and an orientation of the traveling device based on the estimated velocity, the estimated orientation, and the calculated average velocity.

2. The system of claim 1, wherein the traveling device is a pipeline inspection gadget.

3. The system of claim 1, wherein the operations further comprise determining a location of a defect in the pipeline based on the determined location and orientation of the traveling device.

4. The system of claim 1, wherein the plurality of electromagnetic sensors is regularly distributed in a ring shape, the ring shape having a diameter smaller than an inner diameter of the pipeline.

5. The system of claim 1, wherein the inertial measurement unit comprises an accelerometer and a gyroscope.

6. The system of claim 5, wherein the plurality of measurements from the inertial measurement unit comprises linear acceleration and angular velocity.

7. The system of claim 1, wherein the plurality of landmarks comprises a plurality of weld joints joining adjacent pipe segments.

8. The system of claim 1, wherein the determining a location and an orientation of the traveling device comprises using an extended Kalman filter and a Rauch-Tung-Striebel smoother.

9. The system of claim 1, wherein detecting a plurality of landmarks comprises a neural network having inputs and outputs, the inputs of the neural network comprise time-series of induced signature from the plurality of electromagnetic sensors, the outputs of the neural network comprise time stamps of detected landmarks.

10. The system of claim 1, wherein estimating a velocity and an orientation of the traveling device comprises using an extended Kalman filter to combine the plurality of measurements from the inertial measurement unit with an estimated acceleration of the traveling device based on motion dynamics of the traveling device.

11. A method for localizing a traveling device in a pipeline, the traveling device comprising an inertial measurement unit and a plurality of electromagnetic sensors, the method comprising:
    acquiring a plurality of measurements from the inertial measurement unit;
    estimating a velocity and an orientation of the traveling device based on the plurality of measurements from the inertial measurement unit and an estimated acceleration of the traveling device based on a drag force acting on the traveling device;
    acquiring a plurality of measurements from the plurality of electromagnetic sensors;
    detecting a plurality of landmarks of the pipeline based on the plurality of measurements from the plurality of electromagnetic sensors;
    calculating an average velocity of the traveling device based on the detected plurality of landmarks; and
    determining a location and an orientation of the traveling device based on the estimated velocity, the estimated orientation, and the calculated average velocity.

12. The method of claim 11, further comprising determining a location of a defect in the pipeline based on the determined location and orientation of the traveling device.

13. The method of claim 11, wherein the plurality of landmarks comprises a plurality of weld joints joining adjacent pipe segments.

14. The method of claim 11, wherein the determining a location and an orientation of the traveling device comprises using an extended Kalman filter and a Rauch-Tung-Striebel smoother.

15. The method of claim 11, wherein detecting a plurality of landmarks comprises a neural network having inputs and outputs, the inputs of the neural network comprise time-series of induced signature from the plurality of electromagnetic sensors, the outputs of the neural network comprise time stamps of detected landmarks.

16. The method of claim 11, wherein estimating a velocity and an orientation of the traveling device comprises using an extended Kalman filter to combine the plurality of measurements from the inertial measurement unit with an estimated acceleration of the traveling device based on motion dynamics of the traveling device.

17. One or more non-transitory machine-readable storage devices storing instructions for localizing a traveling device in a pipeline, the traveling device comprising an inertial measurement unit and a plurality of electromagnetic sensors, the instructions being executable by one or more processing devices to cause performance of operations comprising:

accessing, from a data store, a plurality of measurements from the inertial measurement unit and a plurality of measurements from the plurality of electromagnetic sensors;

estimating a velocity and an orientation of the traveling device based on the plurality of measurements from the inertial measurement unit and an estimated acceleration of the traveling device based on a drag force acting on the traveling device;

detecting a plurality of landmarks of the pipeline based on the plurality of measurements from the plurality of electromagnetic sensors;

calculating an average velocity of the traveling device based on the detected plurality of landmarks; and determining a location and an orientation of the traveling device based on the estimated velocity, the estimated orientation, and the calculated average velocity.

18. The non-transitory machine-readable storage devices of claim 17, wherein the determining a location and an orientation of the traveling device comprises using an extended Kalman filter and a Rauch-Tung-Striebel smoother.

19. The non-transitory machine-readable storage devices of claim 17, wherein detecting a plurality of landmarks comprises a neural network having inputs and outputs, the inputs of the neural network comprise time-series of induced signature from the plurality of electromagnetic sensors, the outputs of the neural network comprise time stamps of detected landmarks.

20. The non-transitory machine-readable storage devices of claim 17, wherein estimating a velocity and an orientation of the traveling device comprises using an extended Kalman filter to combine the plurality of measurements from the inertial measurement unit with an estimated acceleration of the traveling device based on motion dynamics of the traveling device.

* * * * *